United States Patent [19]

Hikmet

[11] Patent Number: 5,204,763

[45] Date of Patent: Apr. 20, 1993

[54] LIGHT-SCATTERING ELEMENT

[75] Inventor: Rifat A. M. Hikmet, Eindhoven, Netherlands

[73] Assignee: U.S. Philips Corporation, New York, N.Y.

[21] Appl. No.: 858,253

[22] Filed: Mar. 26, 1992

[30] Foreign Application Priority Data

Mar. 26, 1991 [EP] European Pat. Off. ........ 91200675.6

[51] Int. Cl.$^5$ .............................................. G02F 1/13
[52] U.S. Cl. ........................................ 359/51; 359/52; 359/63
[58] Field of Search ................... 359/51, 52, 63, 99; 252/299.01, 299.4

[56] References Cited

U.S. PATENT DOCUMENTS

| 4,671,618 | 6/1987 | Wu et al. | 359/52 |
| 4,688,900 | 8/1987 | Doane et al. | 359/52 |
| 5,136,403 | 8/1992 | Jones et al. | 359/52 |

FOREIGN PATENT DOCUMENTS

WO/8504262 3/1985 European Pat. Off. .

OTHER PUBLICATIONS

Takiron, Abstract, JP-A-1299022, Dec. 1989.

*Primary Examiner*—William L. Sikes
*Assistant Examiner*—Huy K. Mai
*Attorney, Agent, or Firm*—Norman N. Spain

[57] ABSTRACT

A light-scattering element comprising a liquid-crystal material which is dispersed in a matrix of a transparent polymer material is manufactured by mixing at least one polymerizable liquid-crystal material and at least one non-reactive liquid-crystal material. The mixture is provided between two substrates 1 and 2 in the form of a thin layer 5, rubbed polymer layers 3 and 4 being present on the side of the substrates where the mixture is to be provided, as a result of which the molecules in the mixture are oriented. The reactive material is made to cure by means of actinic radiation thereby forming a polymer network in which the non-polymerizable material is present as a continuous phase. The difference between one of the refractive indices of the cured material and the corresponding refractive index of the non-polymerizable liquid-crystal material is less than 0.10, as a result of which the light-scattering element forms a simple polarizer.

6 Claims, 4 Drawing Sheets

| | |
|---|---|
| CH₃—CH₂—⟨⟩—⟨⟩—C≡N | 15% |
| CH₃—(CH₂)₂—⟨⟩—⟨⟩—C≡N | 8% |
| CH₃—(CH₂)₂—O—⟨⟩—⟨⟩—C≡N | 12% |
| CH₃—(CH₂)₄—⟨⟩—⟨⟩—C≡N | 39% |
| CH₃—(CH₂)₄—⟨⟩—⟨⟩—⟨⟩—C≡N | 11% |
| CH₃—(CH₂)₄—⟨⟩—⟨⟩—⟨⟩—C≡N | 15% |
FIG.1
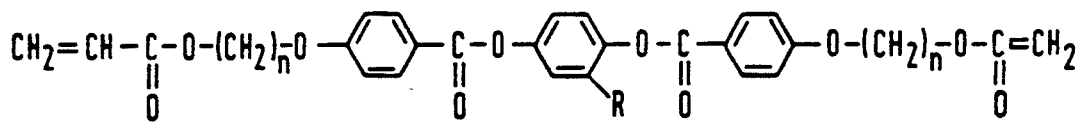
FIG.2
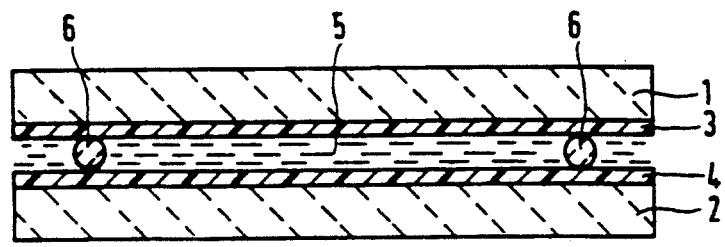
FIG.3

LIGHT-SCATTERING ELEMENT

BACKGROUND OF THE INVENTION

The invention relates to a light-scattering element comprising a liquid-crystalline material which is dispersed in a matrix of a transparent polymer material.

The invention also relates to an application of such a light-scattering element and to a method of manufacturing such a light-scattering element.

Light-scattering elements can suitably be used as optical components for various applications, for example in a display device.

In U.S. Pat. No. 4,688,900, a light-scattering element is described which consists of a liquid crystal material which is dispersed in a transparent polymer material in the form of drops, according to the examples in an optically isotropic thermoplastic material. In the ordinary state the element is opaque. If the temperature is increased so much that the liquid-crystal material becomes isotropic, or if an electric field is applied, the element becomes transparent. Thus, the light-scattering element can be switched between a light-transmitting and a light-scattering mode. By applying a mechanical force or an electric or magnetic field, it becomes possible to orient the liquid-crystal material so that a switchable polarizer is obtained which can be used in cooperation with a second polarizer as a light-switching element.

A disadvantage of the known element is that it cannot be used for light scattering or as a polarizer at relatively high temperatures. Besides, if said element is to be used as a polarizer it is necessary to apply a mechanical force or an electric or magnetic field as a result of which a needlessly complicated optical component is formed if the switching function is not desired.

OBJECTIVES AND SUMMARY OF THE INVENTION

It is an object of the invention to provide, inter alia, a light-scattering element which can be used in a wide temperature range. It is an aim of the invention to provide a simple polarizer in which no or substantially no heat is generated during operation. To this end, it is an object of the invention to provide a polarizer which can suitably be used at a high light intensity such as, for example, in a projection display device. A further object of the invention is to provide a simple and efficacious method of manufacturing such a light-scattering element.

According to the invention, these objects are achieved by a light-scattering element as described in the opening paragraph, in which the matrix consists of a uniaxially oriented material, the difference between one of the refractive indices of the matrix material and the corresponding refractive index of the dispersed material being less than 0.10, measured at the wavelength at which the element is used. According to the invention, a matrix of uniaxially oriented material is obtained by orienting and subsequently polymerizing a monomeric material having liquid-crystal properties.

Preferably, the difference between the ordinary refractive indices of the matrix material and the dispersed material is less than 0.05 and the difference between the extraordinary refractive indices is more than 0.10, measured at the wavelength at which the element is used.

In a suitable embodiment of the light-scattering element according to the invention, the matrix material forms a polymer network. Such an oriented network, containing dispersed material, forms an anisotropic gel having a very high temperature resistance. A network can be obtained by polymerizing a monomeric material having at least two polymerizable groups per molecule. In the non-prepublished Netherlands Patent Application NL 9000808, filed by Applicants, a description is given of an anisotropic gel per se.

As one of the refractive indices of the matrix material, for example the ordinary refractive index, is equal or substantially equal to the corresponding refractive index of the dispersed material, the element is transparent to the corresponding component of unpolarized light which is led through the element. As the other refractive indices, for example the extraordinary refractive indices, are not equal to each other, the corresponding other component of the unpolarized light is scattered. As a result thereof the unscattered light is linearly polarized. The light-scattering element according to the invention is very suitable for use as a polarizer because it is substantially not heated during operation of the element and it is insensitive to changes in temperature.

Polarizers which are known per se comprise uniaxially oriented polymeric materials containing dichroic dyes. In such polarizers light is absorbed in one of the directions of polarization, causing the emanating light to be linearly polarized in the complementary direction. Such polarizers are of simple construction but have the drawback that heat is generated in them as a result of light absorption so that they are not very suitable for use at a high light intensity.

Other polarizers which are known per se comprise crystalline materials having birefringent properties such as in a Nicol prism or in a Wollaston prism. Such polarizers are not very suitable for applications requiring a simple polarizer in the form of a thin layer.

According to the invention, the object of providing a method of manufacturing a light-scattering element is achieved by a method in which at least one polymerizable liquid-crystal material and at least one non-polymerizable liquid-crystal material are mixed, after which the molecules in the mixture are oriented and the polymerizable material is made to cure by means of actinic radiation thereby forming a polymer network in which the non-polymerizable material is dispersed, curing being carried out at a temperature such that one of the refractive indices of the cured material differs less than 0.10 from the corresponding refractive index of the non-reactive liquid-crystalline material. The refractive indices of the reactive material are governed by tmperature. During curing the refractive indices hardly change. The refractive indices are fixed by curing because after curing the temperature dependence is small. Actinic radiation is to be understood to mean herein, for example, irradiation with UV light, electrons, X-rays, gamma rays or high-energy particles. In accordance with a method which is known per se, the use of UV-light will generally involve the addition of a small quantity of a light-sensitive initiator to the reactive material.

In an efficient embodiment of the method according to the invention, the molecules are oriented by providing the mixture in the form of a thin layer between two substrates on which rubbed polymer layers are present on the side where the mixture is to be provided. Suitable polymer layers which are known per se are, for example, polyethylene layers or polyimide layers. If desired, the substrates with the polymer layers may be removed after the curing of the polymerizable material.

BRIEF DESCRIPTION OF THE DRAWING

The invention will be explained in greater detail by means of exemplay embodiments and a drawing, in which FIG. 1 shows the composition of a non-polymerizable liquid-crystalline material for use in a light-scattering element according to the invention, FIG. 2 shows the composition of a monomeric liquid-crystal material having two reactive groups, FIG. 3 diagrammatically shows a step in the method of manufacturing a light-scattering element according to the invention, FIGS. 4, 5 and 6(a-c) show the scattering factor V, as a function of the wavelength λ, in two mutually perpendicular directions of polarization for light-scattering elements according to the invention having different compositions.

DESCRIPTION OF THE PREFERRED EMBODIMENTS

Exemplary Embodiment 1

Figure 4:
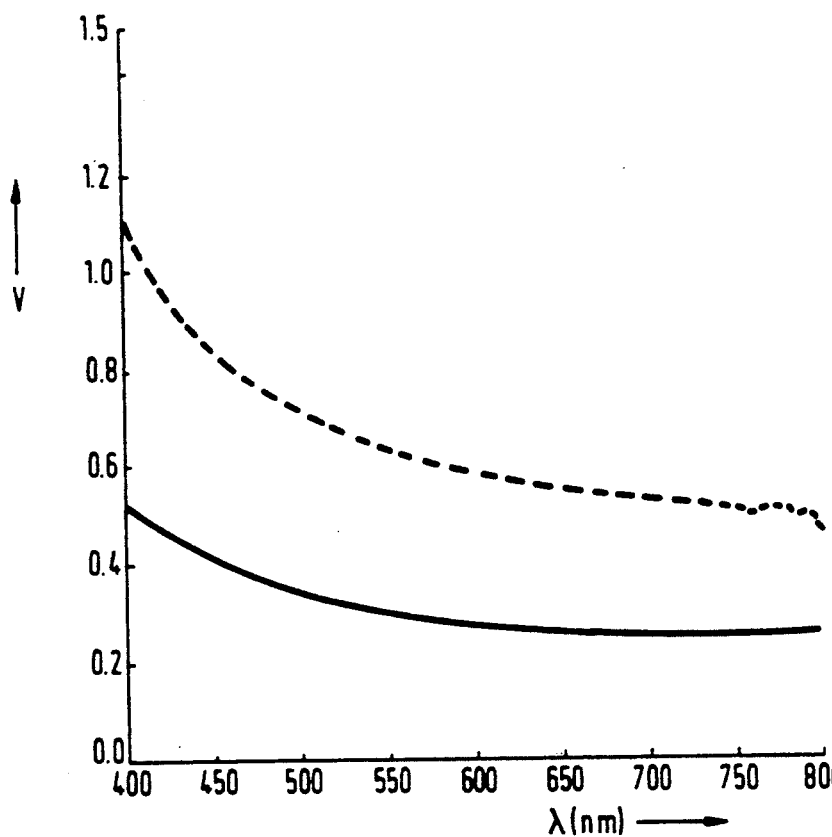

A mixture was prepared consisting of 60% by weight of a non-polymerizable liquid-crystal material, 39% by weight of a polymerizable liquid-crystalline material and 1% by weight of a light-sensitive initiator. The mixture E44 available from BDH Chemicals Ltd. was used as the non-polymerizable liquid-crystal material, in the composition in % by weight shown in FIG. 1. A diacrylate compound, according to the example the compound C6, was used as the reactive liquid-crystal material, the structural formula of which is shown in FIG. 2, where n=6 and —R represents a hydrogen atom —H. As the light-sensitive initiator 2,2-dimethoxy-2-phenyl-acetophenone was used.

Two glass plates 1 and 2, see FIG. 3, were provided with thin polyethylene layers 3 and 4 which were rubbed in one direction with a non-fluff cloth. The liquid-crystal mixture 5 having the above-described composition was provided between the glass plates together with glass fibres 6 having a diameter of 60 μm, the molecules orienting themselves in the direction of rubbing of the polyethylene layers. The glass fibres served as spacers between the glass plates and, hence, determined the thickness of the light-scattering element.

The diacrylate compound was made to cure by irradiation with UV light having an intensity of 0.2 mW/cm2 at the location of the mixture 5. During curing, which was carried out at a temperature of 30° C., phase separation took place in the mixture and a transparent layer having polarizing properties was formed. The refractive indices of the materials used were measured at a temperature of 23° C. and a wavelength of 589 nm. The ordinary refractive index of E44 was 1.53, the extraordinary refractive index was 1.79. In the case of C6 the corresponding values were 1.50 and 1.68, respectively. The refractive indices of the individual materials were measured without additions, and in the case of the polymerizable compounds measuring took place after polymerization.

FIG. 4 shows the scattering factor V, as a function of the wavelength λ, measured in two mutually perpendicular directions of polarization. The upper, dotted line shows the result of measurements carried out perpendicularly to the direction of rubbing of the polyethylene layers and, hence, perpendicularly to the direction in which the polymer molecules are oriented. The lower, solid line shows the result of measurements carried out parallel to the orientation direction. According to this example the scattering factor V is defined by the equation:

$$V = -\log(I/I_0)$$

where I is the intensity of the transmitted light and $I_0$ is the intensity of the irradiated light. The light-scattering element on which the measurements were carried out had a constant thickness of 60 μm.

FIG. 4 shows that light which is polarized perpendicularly to the direction in which the polymer molecules are oriented is subject to a much stronger degree of scattering than parallel polarized light. Said Figure further shows that scattering is most effective at short wavelengths, at which wavelengths the two directions of polarization also have the largest difference in intensity of the transmitted light.

Exemplary Embodiment 2

A light-scattering element was manufactured as indicated in exemplary embodiment 1, except that the diacrylate compound C6 was replaced by the same quantity of the alternativediacrylate compound C6M. The structural formula of the compound C6M is shown in FIG. 2, where n=6 and —R is a methyl group —CH3. After curing the ordinary refractive index of C6M was 1.49, the extraordinary refractive index was governed by the curing temperature and was 1.68 according to the example.

Figure 5:
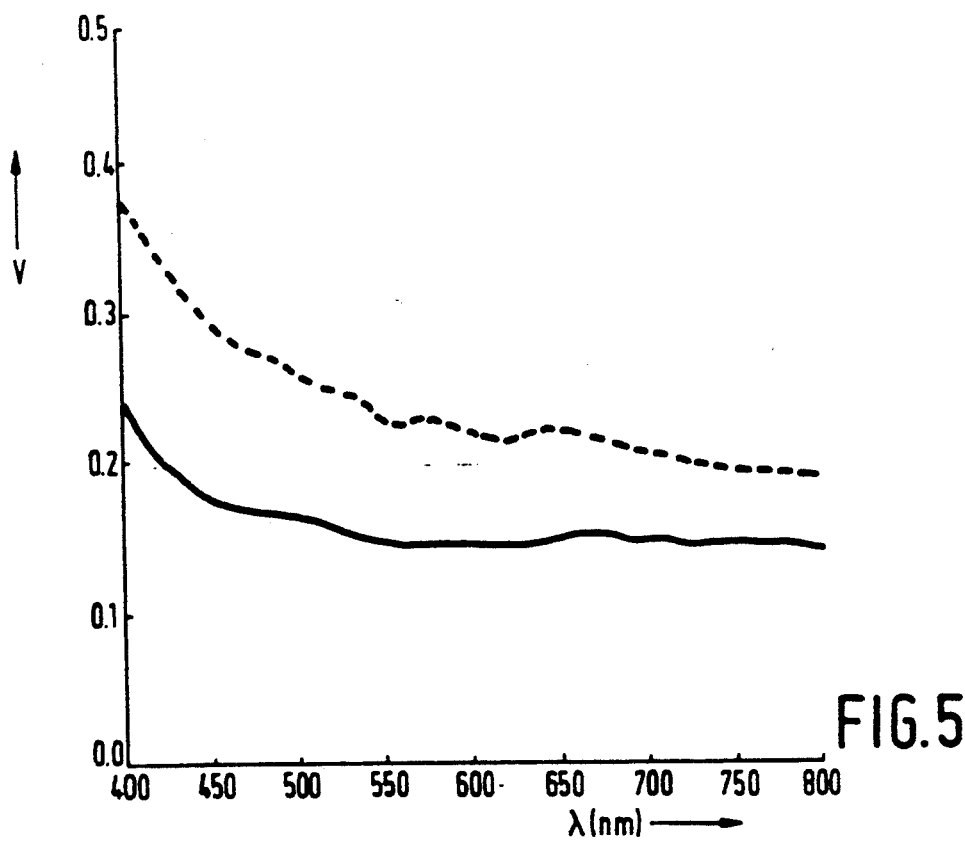

FIG. 5 shows the scattering factor V as a function of the wavelength λ. As in exemplary embodiment 1, it was found that the light which is polarized perpendicularly to the direction in which the polymer molecules are oriented is subject to a greater degree of scattering than parallel-polarized light. The degree of light scattering is less than in the case of exemplary embodiment 1, which can be ascribed to steric hindrance between the C6M molecules, having a retarding influence on the formation of light-scattering domains. To obtain a suitable polarizer both the refractive index differences and the presence of a regular order of the polymer material are important.

Exemplary Embodiment 3

A light-scattering element was manufactured as indicated in exemplary embodiment 1, except that the non-polymerizable liquid-crystal material E44 was replaced by an alternative liquid-crystal material, namely ZLI-2806 available from Merck, in quantities of 40, 60 and 80% by weight, the corresponding quantities of the diacrylate compound C6 being 59, 39 and 19% by weight, respectively. The ordinary refractive index of ZLI-2806 was 1.44, the extraordinary refractive index was 1.53.

Figure 6A:
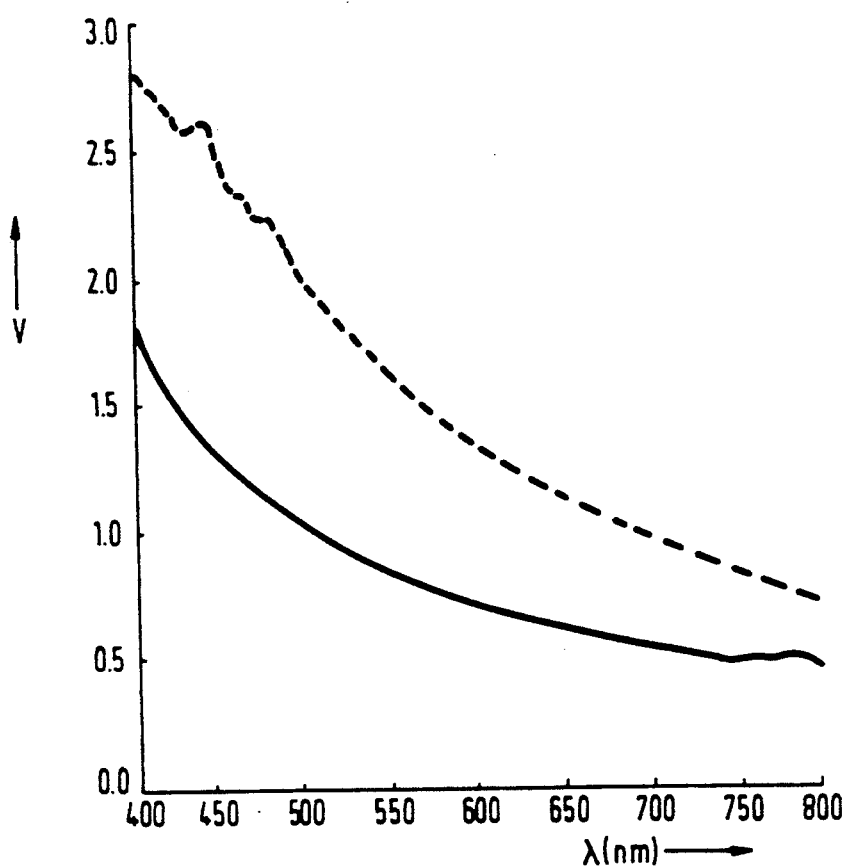
Figure 6B:
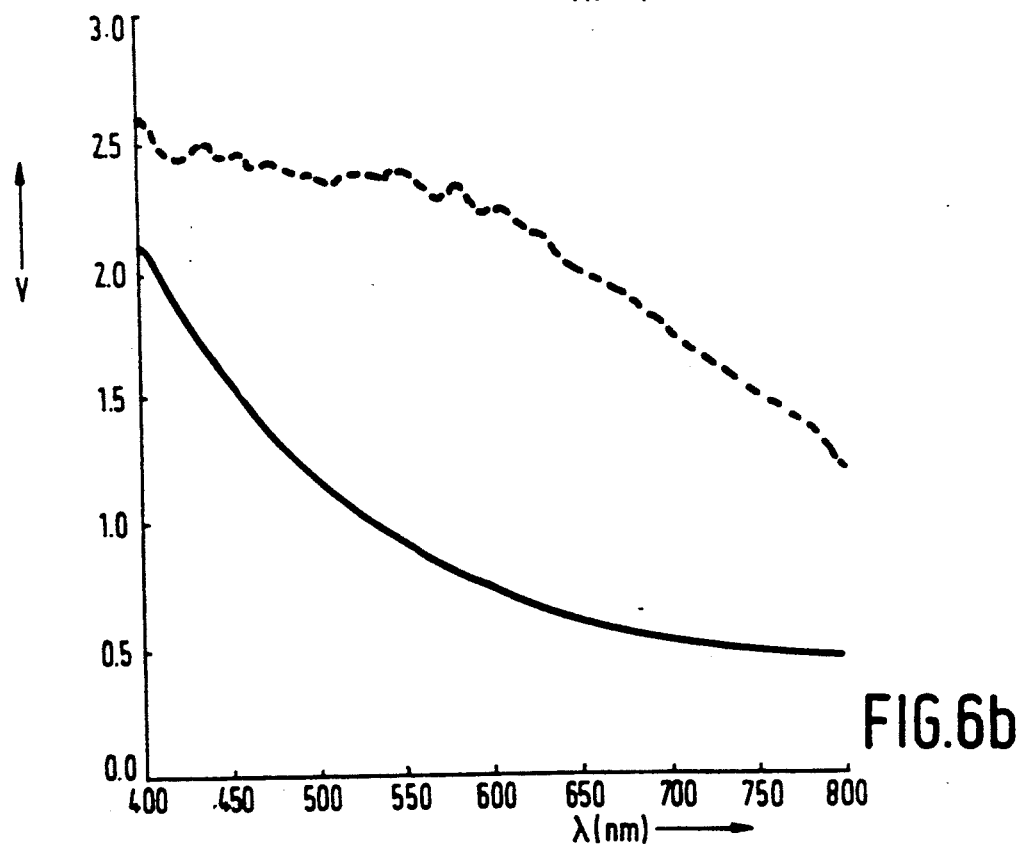
Figure 6C:
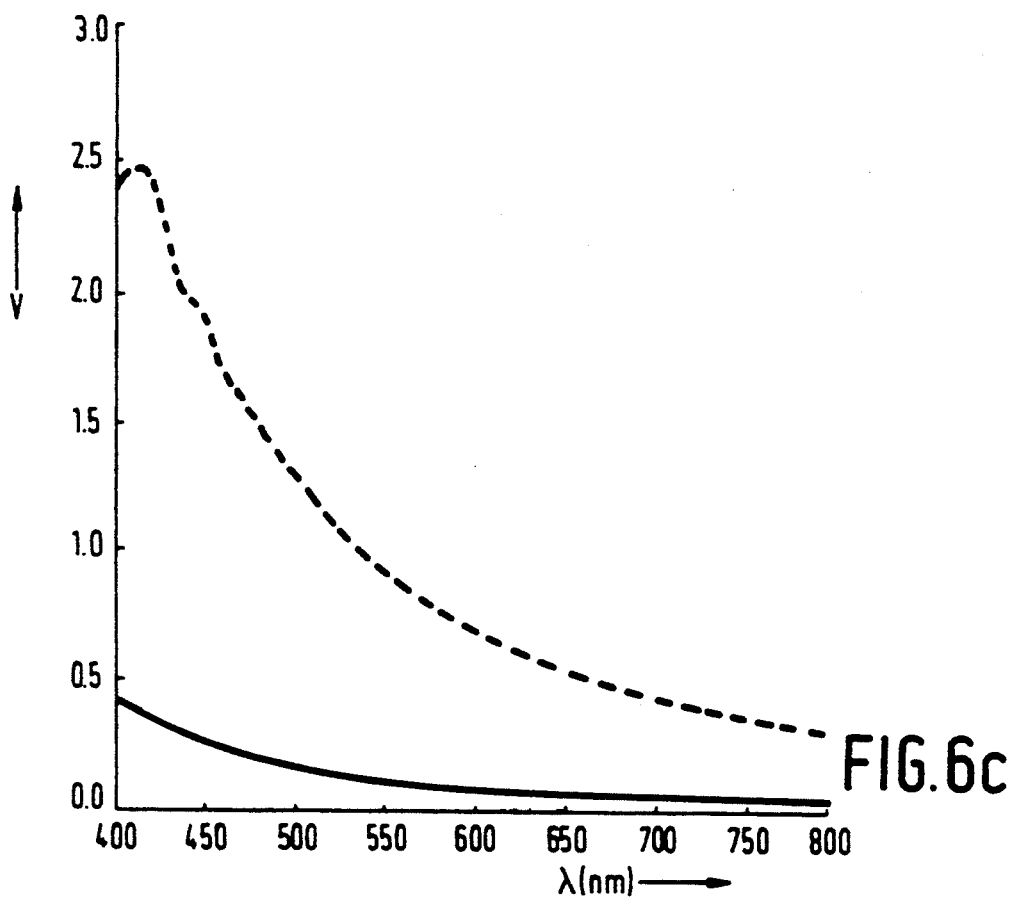

FIG. 6(a-c) shows the scattering factor V, as a function of the wavelength λ, for quantities of ZLI-2806 of 80% by weight (a), 60% by weight (b) and 40% by weight (c), respectively. In both directions of polarization the degree of light scattering exceeds that of exemplary embodiment 1. When 40% by weight of ZLI-2806 is used, the degree of scattering of the parallel-polarized light is comparatively low and the degree of scattering of the perpendicularly polarized light is comparatively high, in particular at short wavelengths, bringing about a very effective polarizing effect.

Exemplary Embodiment 4

A light-scattering element was manufactured as indicated in exemplary embodiment 3, except that the diacrylate compound C6 was replaced by an alternative reactive compound, namely C4M, the structural formula of which is shown in FIG. 2, where n=4 and —R is a methyl group —$CH_3$. The quantity of ZLI-2806 was 60% by weight, the quantity of C4M was 39% by weight, the remaining 1% by weight consisted again of the light-sensitive initiator 2,2-dimethoxy-2-phenyl-acetophenone. The ordinary refractive index of C4M was 1.53, the extraordinary refractive index was 1.66.

Figure 7:
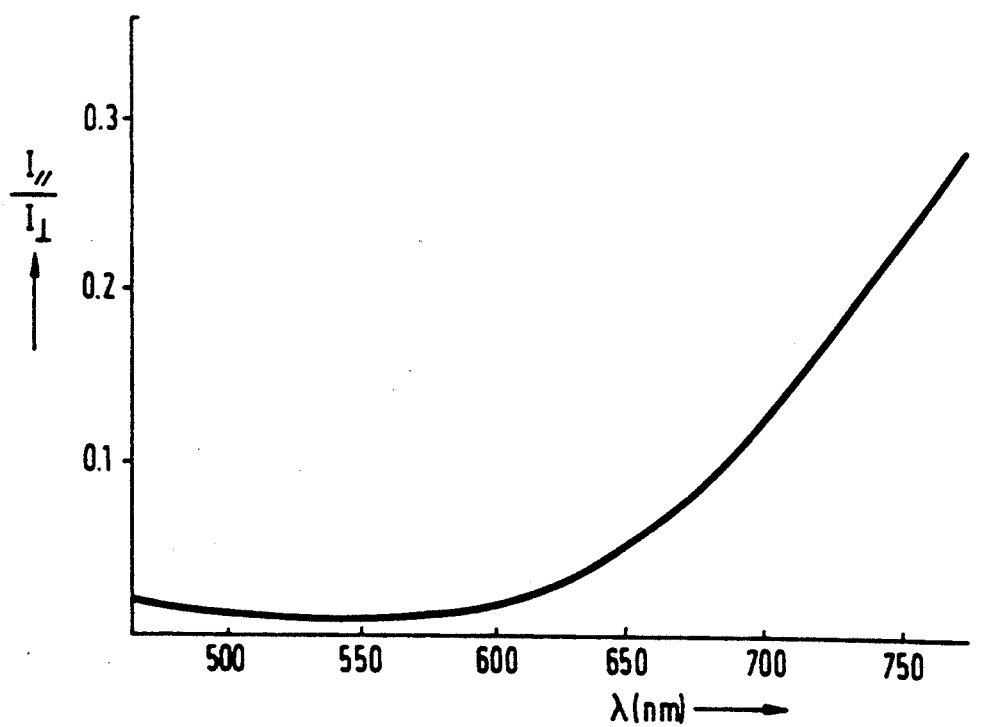
FIG. 7 shows the ratio between the intensities I of the transmitted light in two mutually perpendicular directions of polarization, as a function of the wavelength λ, for a light-scattering element according to the invention.

FIG. 7 shows the ratio of intensities of the transmitted light which is polarized parallel, $I_\parallel$, to the direction of orientation of the polymer molecules and of light which is polarized perpendicularly, $I_\perp$, thereto, as a function of the wavelength $\lambda$. The Figure shows that an effective polarizing effect is obtained, in particular, at wavelengths shorter than approximately 650 nm.

I claim:

1. A light-scattering element comprising a liquid-crystal material which is dispersed in a matrix of a transparent polymer material, characterized in that the matrix consists of polymer network of a uniaxially oriented polymer material, the difference between one of the refractive indices of the polymer material and the corresponding refractive index of the dispersed material being less than 0.10, measured at the wavelength at which the element is used.

2. A light-scattering element as claimed in claim 1, in which the difference between the ordinary refractive indices of the matrix material and the dispersed material is less than 0.05 and the difference between the extraordinary refractive indices is more than 0.10, measured at the wavelength at which the element is used.

3. The use of a light-scattering element as claimed in claim 1 as a polarizer.

4. The use of a light-scattering element as claimed in claim 2 as a polarizer.

5. A method of manufacturing a light-scattering element comprising a liquid-crystalline material which is dispersed in a matrix of a transparent polymer material, characterized in that at least one polymerizable liquid-crystalline material and at least one non-polymerizable liquid-crystalline material are mixed, after which the molecules in the mixture are oriented and the reactive material is made to cure by means of actinic radiation thereby forming a polymer network in which the non-polymerizable material is dispersed, curing being carried out at a temperature such that one of the refractive indices of the cured material differs less than 0.10 from the corresponding refractive index of the non-polymerizable liquid-crystalline material.

6. A method as claimed in claim 5, in which the molecules are oriented by providing the mixture in the form of a thin layer between two substrates on which rubbed polymer layers are present on the side where the mixture is to be provided.

* * * * *